Dec. 21, 1948.  L. S. CARLESS  2,456,618
AMMUNITION BOOSTER CONTROL
Filed Oct. 5, 1944
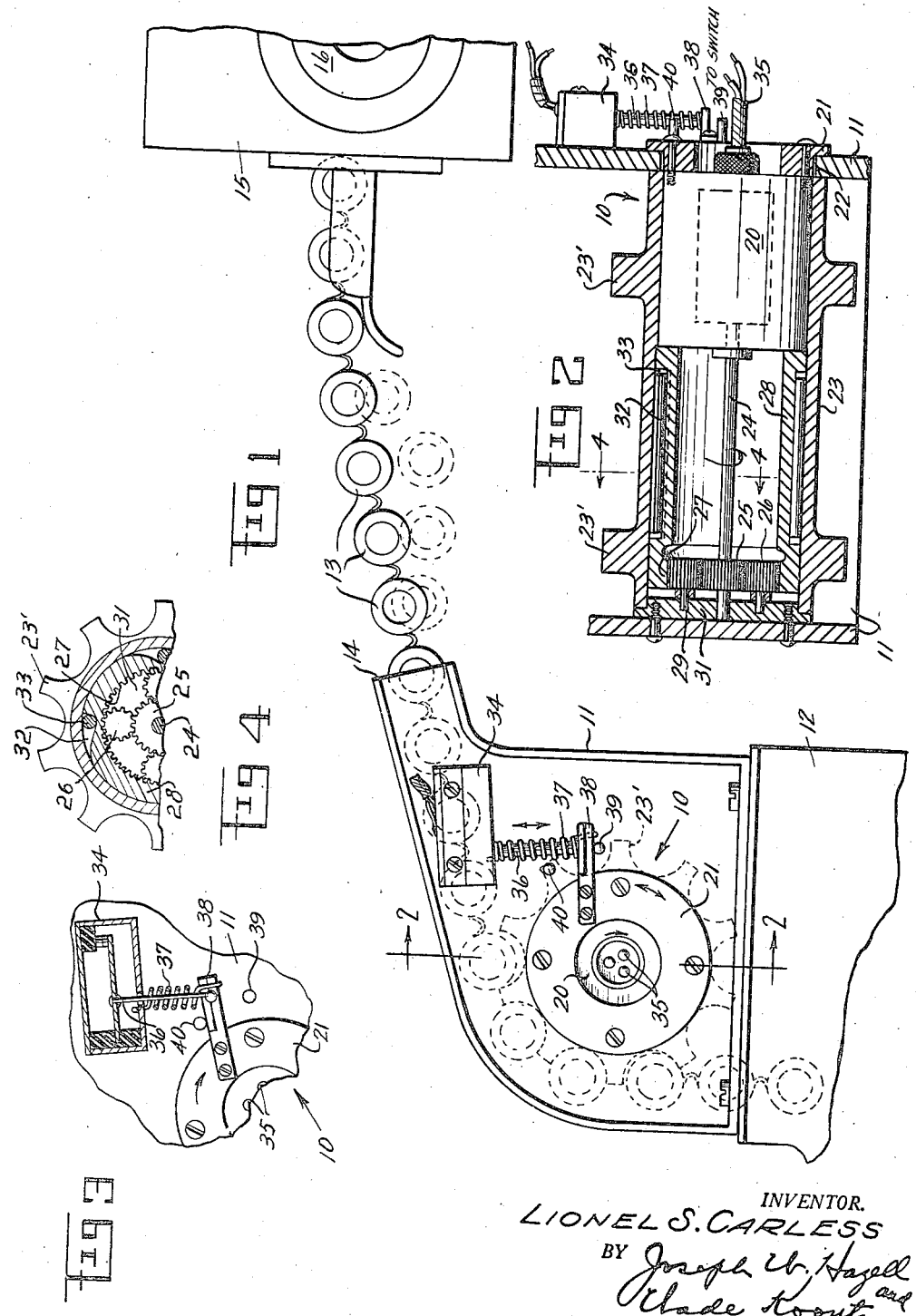
INVENTOR.
LIONEL S. CARLESS
BY
ATTORNEYS Patented Dec. 21, 1948

2,456,618

UNITED STATES PATENT OFFICE 2,456,618

AMMUNITION BOOSTER CONTROL

Lionel S. Carless, Mountain View, N. J.

Application October 5, 1944, Serial No. 557,349

4 Claims. (Cl. 89—33)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to ammunition boosters used to accelerate the feeding of belts of ammunition to a machine gun and the like, in aid to the customary feed mechanism on the gun, so as to prevent jamming of the gun through excessive towing drag on such feed mechanism, etc.

An object of this invention is to provide an improved ammunition booster for accelerating the movement of a belt of ammunition to the usual feed mechanism of a machine gun, wherein the countertorque that is developed in the driving means of the booster, by the belt-feeding operation, will be utilized as a principle of controlling the booster.

Another object of this invention is to provide an ammunition booster whereby the force supplied by the booster through the action of its driving motor can be regulated and predetermined to fit the requirements of the particular ammunition feed system of any gun installation, and especially avoid too rapid booster feed and the consequent over-running of the regular gun-feeding mechanism.

A more particular object of this invention is to utilize the countertorque developed in the booster, by the action of the booster motor in the belt-feeding operation, as a medium of controlling the booster; and this being preferably accomplished by mounting the motor housing of the booster so as to be rotary in its support, and arranged so as to operate the control switch of the motor circuit and cut out the motor whenever excessive countertorque is created in the booster due to the torque developed in the sprocket in towing the belt.

Briefly stated, this ammunition-belt booster comprises a belt-towing sprocket and a motor housing provided with means whereby it drives the sprocket, said sprocket being freewheeling relative to the housing to allow it to overrun the motor, and the whole booster being provided with bearing means enabling it to turn in its support and having an arm which bears against a switch pin braced by a spring of predetermined loading. When force is applied by the motor to the sprocket for towing the belt, a torque is applied to the sprocket and a countertorque is thereby set up in the motor housing so as to rotate or turn it with its bearing and arm to open the motor switch and cut out the motor, whenever the predetermined torque on the sprocket, caused by excessive towing drag on the belt, is reached. When the torque load on the sprocket is decreased, then said spring again closes the motor switch so as to operate the booster and supply more ammunition.

Some advantages provided with this booster arrangement and construction are:

1. The spring load is regulated so that the feeding of the booster will be cut off automatically when it is too rapid for the regular gun feeding mechanism to utilize, thus avoiding jamming the gun or damaging the track.

2. The booster motor will be cut out before it is overloaded and is burnt out, wherefore the towing power of the booster motor can be freely utilized to its full capacity.

3. The principle of this invention may be applied to all installations and types of electrically actuated boosters, as it simply involves the application or utilization in the booster of the swingably mounted or floating motor and use of its countertorque to operate the spring loaded switch for cutting the current to the motor.

Other objects and advantages are attained with this invention, as will become apparent from the following description, taken in connection with the accompanying drawing wherein the invention is shown in its preferred form, it being evident that other arrangements and forms of construction may be resorted to for carrying out the objects and purposes of this invention.

In the drawing:

Fig. 1 is a side elevational view illustrating my invention as applied to a booster which is mounted on an ammunition box to facilitate feeding a belt of ammunition to a machine gun.

Fig. 2 is an enlarged vertical sectional view of the invention, taken substantially on line 2—2 of Fig. 1.

Fig. 3 is a fragmentary view showing the booster swung by excessive torque, and having moved the control switch of the motor circuit to its open position.

Fig. 4 is a sectional detail view taken on line 4—4 of Fig. 2, showing the freewheeling of the sprocket.

In the drawing an embodiment of this invention is illustrated in its preferred form of construction and as applied to a booster 10 which is shown mounted in stationary supporting means 11. This supporting means, as presented herein, is in the form of a casing which is mounted upon the ammunition box 12 and is arranged to guide a belt of ammunition 13 through its feed outlet 14 to the usual gun actuating mechanism and ammunition feed mechanism 15 of a machine gun 16.

Such feed mechanism is adapted to tow the belt of ammunition to the gun under normal conditions, and the booster is provided to accelerate such feeding and especially the towing of excessively heavy or long belts of ammunition to the gun.

The improved booster 10 is mounted in a floating position on the supporting casing 11, and this is conveniently accomplished by mounting the driving means 20, which is shown in the form of an electric motor, on a bearing means 21, disclosed as an annular plate which is secured to the motor housing and whereby the latter is mounted to swing or rotate in a circular opening 22 provided in a side wall of the casing 11.

The motor 20 drives sprocket means 23, shown as including a cylindrical body having a pair of sprocket wheels 23' fixed thereon which are adapted to receive and tow the cartridges of the ammunition belt to the feed mechanism of the gun.

The operative connection between the motor and the sprocket means 23 is herein shown as comprising an extending portion 24 on the shaft of the motor and a gear set including a gear 25 on said shaft portion and pinions 26 driven thereby and driving an internal gear 27 on a sleeve 28, said pinions being pivotally mounted by means 29 on an end plate 31 which is secured to the side wall of the casing 11.

The sprocket means 23 surrounds the motor 20 and the sleeve 28 and is arranged to be driven by means of said sleeve and also to be freewheeling thereon so as to overrun the motor, as is illustrated by the rollers 33 mounted in the inclined slots 32 provided on the peripheral portion of the sleeve 28. Thus the sprocket means is driven by the motor and is enabled to overrun the same, as indicated by the arrow shown in Fig. 2.

The means provided herein to cut out the drive means or motor 20 comprises a switch 34, which is preferably mounted on the casing 11, and which is connected with or interposed in the motor circuit 35, whereby to cut the current to the motor when the belt load and the torque on the sprocket becomes excessive. Said switch has a plunger or actuating element 36 provided with an extension spring 37 thereon which is of predetermined loading or resisting force, while an arm 38 is secured to the bearing plate 21 and extends therefrom to operate the plunger 36 and extend the spring 37, said arm being normally urged by the spring 37 and held against stop pin 40 with the switch closed, as indicated in Fig. 3 of the drawing.

In summary, with the use of this form of booster control the excessive torque load caused on the sprocket 23 will produce an equal counter torque load on the rotatably mounted floating motor 20 and thereby on its attached lever arm 38; and this arm bears against the spring-held element 36 thereby operating the micrometer switch 34 to cut out the booster motor. When the torque load is then decreased, upon the customary gun-feeding mechanism 15 again taking the ammunition as fast as fed thereto by the booster, and thereby assisting the booster in drawing the belt of ammunition, then the spring 37 pulls lever 38 toward the switch (see Fig. 3). The switch thereupon closes and the booster is again in operation, aiding the said mechanism 15 in feeding ammunition to the gun.

The force supplied for this improved booster, through the action of its motor in towing the ammunition belt, can thus be regulated and predetermined, by using the suitable spring of the proper predetermined loading, so as to fit the requirements of the feed system of any installation, for properly aiding the customary feeding mechanism of the gun to provide a smoothly flowing stream of ammunition.

I claim:

1. A booster for use in feeding a belt of ammunition to a machine gun, said booster comprising a sprocket whereon the belt travels, a motor and means rotative around the motor shaft and operatively connected with the sprocket to operate it so that said motor drives the sprocket enabling it to overrun the motor, a stationary support and bearing means whereby the motor is rotatably mounted in the support, means associated with said support for controlling the motor, said control means including a spring of predetermined loading, and means extending from the bearing means to actuate the spring-equipped control means and being resisted by said spring to normally retain the motor against reactive rotation, whereby, when a torque is applied by the motor to the sprocket for towing the belt a countertorque is set up in the motor and its bearing means, so as to overcome the spring and actuate the control means to cut out the motor whenever a predetermined torque load on the sprocket is reached.

2. A booster for use in feeding a belt of ammunition to the feed mechanism of a machine gun, comprising sprocket means whereby said belt is adapted to be towed, a motor having a circuit including a normally closed switch, means including tubular means rotative about the drive shaft of the motor and driven by said shaft for driving the sprocket means and around which the sprocket means is freewheeling to overrun the motor, stationary supporting means wherein the motor driven sprocket means and motor are rotatably mounted and which carries the switch, actuating means for the switch and including a spring of predetermined loading, and means carried by the motor to operate the spring-held actuating means and open the switch when the torque load applied by the sprocket means to the motor becomes excessive and rotates the motor reactively, whereby the force supplied by the booster can be predetermined to fit the requirements of the ammunition feed system.

3. A booster for use in feeding a belt of ammunition to the feed mechanism of a machine gun, said booster comprising a cylindrical sprocket adapted to tow the belt, a sprocket-driving motor having a drive shaft positioned axially of the sprocket, a circuit for the motor and including a normally closed switch, a tubular member mounted about said shaft and within said sprocket, means connecting said member with the shaft to rotate the member about the shaft, means operatively connecting said member and sprocket to rotate the sprocket along with the member and also allow freewheeling of the sprocket thereon, a stationary support upon which said switch is mounted, bearing means whereby the motor is rotatively mounted on the support, an element operatively connected to the motor bearing for actuating the switch, a spring associated with said element and said switch of predetermined loading which is positioned to prevent action of the element caused by rotation of the motor bearing under normal load conditions, and means carried by the motor to operate said element against the spring action and open the switch when the load applied by the sprocket to the motor becomes excessive.

4. In combination with a stationary booster-support, a booster for use in feeding a belt of ammunition to a machine gun, means for mounting said booster on said support to have rotary movement in a belt-feeding forward direction and also in a retroactive direction thereon, said booster comprising a motor and a sprocket on the motor and means operatively connecting them for rotating the sprocket about the rotor axis of the motor and allowing freewheeling of the sprocket, control means including means on the support and a regulated spring thereon to retain said control means idle while the motor is under normal load conditions, and means movable with the motor to overcome the spring and actuate the control means when the torque load applied by the sprocket to the motor becomes excessive and retracts the booster, whereby the force supplied by the booster can be predetermined to fit the requirement of the ammunition feed system.

LIONEL S. CARLESS.

REFERENCES CITED

The following references are of record in the file of this patent:

UNITED STATES PATENTS

| Number | Name | Date |
|---|---|---|
| 2,005,122 | Young et al. | June 18, 1935 |
| 2,390,477 | Trotter | Dec. 4, 1945 |
| 2,396,136 | Trotter | Mar. 5, 1946 |

FOREIGN PATENTS

| Number | Name | Date |
|---|---|---|
| 690,426 | France | June 17, 1930 |